(12) United States Patent
Degioanni et al.

(10) Patent No.: US 12,099,631 B2
(45) Date of Patent: Sep. 24, 2024

(54) RULE-BASED ANONYMIZATION OF DATASETS

(71) Applicant: ACCENTURE GLOBAL SOLUTIONS LIMITED, Dublin (IE)

(72) Inventors: Laura Wendy Hélène Sylvie Angèle Degioanni, Roquefort-les-Pins (FR); Richard Vidal, Antibes (FR); Laetitia Kameni, Juan-les-pins (FR); Yann Fraboni, Nice (FR)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 507 days.

(21) Appl. No.: 17/462,865

(22) Filed: Aug. 31, 2021

(65) Prior Publication Data

US 2022/0414262 A1    Dec. 29, 2022

(30) Foreign Application Priority Data

Jun. 10, 2021 (EP) .................................. 21305793

(51) Int. Cl.
*G06F 21/62* (2013.01)
*G06N 20/00* (2019.01)

(52) U.S. Cl.
CPC ......... *G06F 21/6254* (2013.01); *G06N 20/00* (2019.01)

(58) Field of Classification Search
CPC ........................... G06F 21/6254; G06N 20/00
See application file for complete search history.

(56) References Cited

U.S. PATENT DOCUMENTS

| | | | |
|---|---|---|---|
| 2015/0269391 A1* | 9/2015 | Ukil ................... | G06F 21/6254 726/30 |
| 2017/0083708 A1* | 3/2017 | Braghin .............. | G06F 16/2365 |
| 2019/0266353 A1* | 8/2019 | Gkoulalas-Divanis | ...................... G06F 21/602 |
| 2022/0215127 A1* | 7/2022 | Oqaily ................ | G06F 21/6209 |

* cited by examiner

*Primary Examiner* — Matthew T Henning
(74) *Attorney, Agent, or Firm* — Mannava & Kang, P.C.

(57) ABSTRACT

Embodiments herein facilitate a rule-based anonymization of an original dataset. The system may include a processor including a data privacy evaluator and a rules engine. The data privacy evaluator may receive at least one anonymized dataset corresponding to a predefined strategy of anonymization. The at least one anonymized dataset may include a variation from the original dataset by at least one of a privacy metric and a consistency metric. The data privacy evaluator may evaluate the at least one anonymized dataset and may generate a final output value based on a first output and a second output. The processor may assess the final output value with respect to a predefined threshold through the rules engine. If the final output value may be equal or higher than the predefined threshold, the system may permit an access to the anonymized dataset.

19 Claims, 10 Drawing Sheets

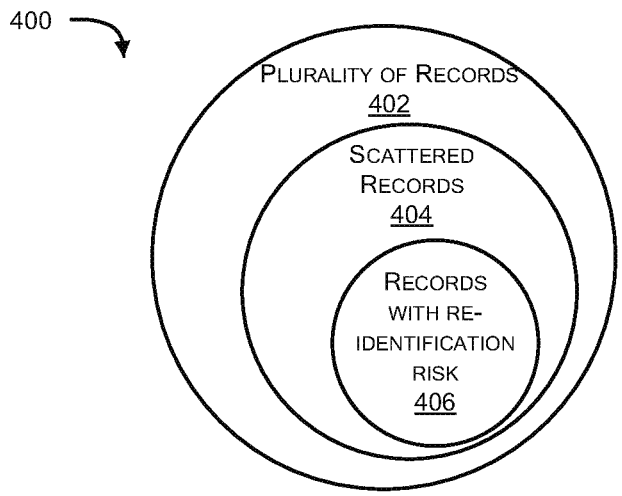

FIG. 4A

| AGE | ETHNICITY | GENDER | MARITAL-STATUS | EDUCATIONAL | HOURS-PER WEEK | COUNTRY | INCOME |
|---|---|---|---|---|---|---|---|
| 25 | AFRICAN AMERICAN | MALE | SINGLE | 11TH | 40 | NORTH AMERICA | 0 |
| 38 | CAUCASIAN | MALE | MARRIED | HS-GRAD | 50 | NORTH AMERICA | 0 |
| 28 | CAUCASIAN | MALE | MARRIED | ASSOC-ACDM | 40 | NORTH AMERICA | 1 |
| 44 | AFRICAN AMERICAN | MALE | MARRIED | SOME-COLLEGE | 40 | NORTH AMERICA | 1 |
| 18 | CAUCASIAN | FEMALE | SINGLE | SOME-COLLEGE | 30 | NORTH AMERICA | 0 |
| 34 | CAUCASIAN | MALE | SINGLE | 10TH | 30 | NORTH AMERICA | 0 |
| 29 | AFRICAN AMERICAN | MALE | SINGLE | HS-GRAD | 40 | NORTH AMERICA | 0 |
| 63 | CAUCASIAN | MALE | MARRIED | PROF-SCHOOL | 32 | NORTH AMERICA | 1 |
| 24 | CAUCASIAN | FEMALE | SINGLE | SOME-COLLEGE | 40 | NORTH AMERICA | 0 |
| 55 | CAUCASIAN | MALE | MARRIED | 7TH – 8TH | 10 | NORTH AMERICA | 0 |
| 65 | CAUCASIAN | MALE | MARRIED | HS-GRAD | 40 | NORTH AMERICA | 1 |
| 36 | AFRICAN AMERICAN | MALE | MARRIED | BACHELORS | 40 | NORTH AMERICA | 0 |
| 26 | CAUCASIAN | FEMALE | SINGLE | HS-GRAD | 39 | NORTH AMERICA | 0 |
| 58 | CAUCASIAN | MALE | MARRIED | HS-GRAD | 35 | NORTH AMERICA | 0 |
| 48 | CAUCASIAN | MALE | MARRIED | HS-GRAD | 48 | NORTH AMERICA | 1 |

| NO | VARIABLES 442 | ATTRIBUTES 444 |
|---|---|---|
| 1 | AGE | QUASI-IDENTIFIER |
| 2 | ETHNICITY | SENSITIVE |
| 3 | GENDER | QUASI-IDENTIFIER |
| 4 | MARITAL-STATUS | QUASI-IDENTIFIER |
| 5 | EDUCATIONAL | SENSITIVE |
| 6 | HOURS-PER-WEEK | NEUTRAL |
| 7 | COUNTRY | NEUTRAL |
| 8 | INCOME | SENSITIVE (TARGET) |

| SIZE EQUIVALENCE CLASS | NUMBER OF EC | NUMBER OF RECORDS |
|---|---|---|
| 1 RECORD | 92 | 92 |
| 2 RECORDS | 55 | 110 |
| 3 RECORDS | 52 | 156 |
| 4 RECORDS | 63 | 252 |
| 5 RECORDS | 52 | 260 |

FIG. 4D

RULE-BASED ANONYMIZATION OF DATASETS

PRIORITY

The present application claims priority under 35 U.S.C. 119(a)-(d) to European patent application number 21305793.8, having a filing date of Jun. 10, 2021, the disclosure of which is hereby incorporated by reference in its entirety.

BACKGROUND

Data privacy may be important to protect sensitive information pertaining to an individual or an organization. To that end, data anonymization is commonly used to ensure data privacy in several applications. Data Anonymization is also recommended within the provisions of Article 29 of Data Protection Working Party. The data anonymization may include all solutions that process data irreversibly in a way to prevent data identification. Examples of data anonymization include data generalization technique such as, for example, k-anonymity technique. However, the anonymization may reduce the value of the dataset and the ability to build meaningful models using anonymized datasets. In general, if the anonymized dataset has more privacy then the utility may be less and vice versa. Therefore, there is a need for an appropriate trade-off between the privacy and the utility of the anonymized datasets. The degree of trade off may depend on the type of domain i.e. a field to which the dataset may belong to and other parameters such as purpose of anonymization.

Existing techniques rely on human discretion to evaluate the extent of privacy and utility. This manual evaluation is not only tedious but also involves associated time, manpower and can also be unreliable. In addition, the evaluation performed by human experts may not be consistent in evaluating or comparing multiple versions of anonymization of same original dataset. Further, if anonymized datasets that are not protected enough are permitted to be used based on such an evaluation, then such use may lead to re-identification of at least one of an individual, information and entity. This may cause loss of confidential data and, therefore, is not an effective privacy control measure.

SUMMARY

An embodiment of present disclosure includes a system including a processor. The processor may include a data privacy evaluator and a rules engine. The data privacy evaluator may receive an original dataset pertaining to a domain. The data privacy evaluator may receive the original dataset from a raw data repository associated with the system. The data privacy evaluator may receive at least one anonymized dataset corresponding to a predefined strategy of anonymization. The anonymized dataset may be received from at least one of an anonymization engine and an anonymized data repository. The at least one anonymized dataset may include a variation from the original dataset by at least one of a privacy metric and a consistency metric. The privacy metric may pertain to a risk of re-identification of an information. The information may pertain to an entity in the at least one anonymized dataset corresponding to the original dataset. The consistency metric may pertain to a combination of a utility metric and a similarity metric. The data privacy evaluator may evaluate the at least one anonymized dataset with respect to the original dataset through the privacy computation engine to generate a first output. The first output may correspond to the privacy metric. The data privacy evaluator may evaluate the at least one anonymized dataset with respect to the original dataset through the consistency computation engine to generate a second output. The second output may correspond to the consistency metric. Based on the first output and the second output, the processor may generate a final output value. The final output value may indicate an extent of the variation of the at least one anonymized dataset with respect to the original dataset.

Another embodiment of the present disclosure may include a method for facilitating a rule-based anonymization of an original dataset. The method may include a step of receiving the original dataset and at least one anonymized dataset corresponding to a predefined strategy of anonymization of the original dataset. The method may include a step of evaluating the at least one anonymized dataset with respect to the original dataset to generate a first output corresponding to a privacy metric. The method may include a step of evaluating the at least one anonymized dataset with respect to the original dataset. The evaluation may generate a second output corresponding to a consistency metric. The method may include a step of generating, based on the first output and the second output, a final output value, indicating extent of a variation of the at least one anonymized dataset with respect to the original dataset. The method may include a step of permitting automatically, based on a first set of predefined rules, an access to the at least one anonymized dataset, if the final output value is equal to or above a predefined threshold. If the final output value is less than the predefined threshold, the method may include the step of at least one of generating an alert and automatically communicating feedback to an anonymization engine. The alert may be generated to indicate that the pre-defined strategy of anonymization is insufficient to provide desired privacy protection of the original dataset. The feedback may be communicated to generate another anonymized dataset for the corresponding original dataset based on a modified predefined strategy of anonymization.

Yet another embodiment of the present disclosure may include a non-transitory computer readable medium comprising machine executable instructions that may be executable by a processor to receive an input data corresponding to a programming language. The processor may receive an original dataset and at least one anonymized dataset corresponding to a predefined strategy of anonymization of the original dataset. The processor may evaluate the at least one anonymized dataset with respect to the original dataset to generate a first output corresponding to a privacy metric. The processor may evaluate the at least one anonymized dataset with respect to the original dataset. The processor may generate a second output corresponding to a consistency metric. The processor may generate, based on the first output and the second output, a final output value, indicating extent of a variation of the at least one anonymized dataset with respect to the original dataset. The processor may permit automatically, based on a first set of predefined rules, an access to the at least one anonymized dataset, if the final output value is equal to or above a predefined threshold. If the final output value may be less than the predefined threshold, the method may include at least one of generating an alert and automatically communicating feedback to an anonymization engine. The alert may be generated to indicate that the pre-defined strategy of anonymization is insufficient to provide desired privacy protection of the original dataset. The feedback may be communicated to generate another anonymized dataset for the corresponding original dataset based on a modified predefined strategy of anonymization.

BRIEF DESCRIPTION OF DRAWINGS

FIGS. 4A-4E illustrate an overview for one or more aspects of computation by a privacy computation engine of the system of FIG. 1, according to an example embodiment of the present disclosure.

DETAILED DESCRIPTION

Figure 1:
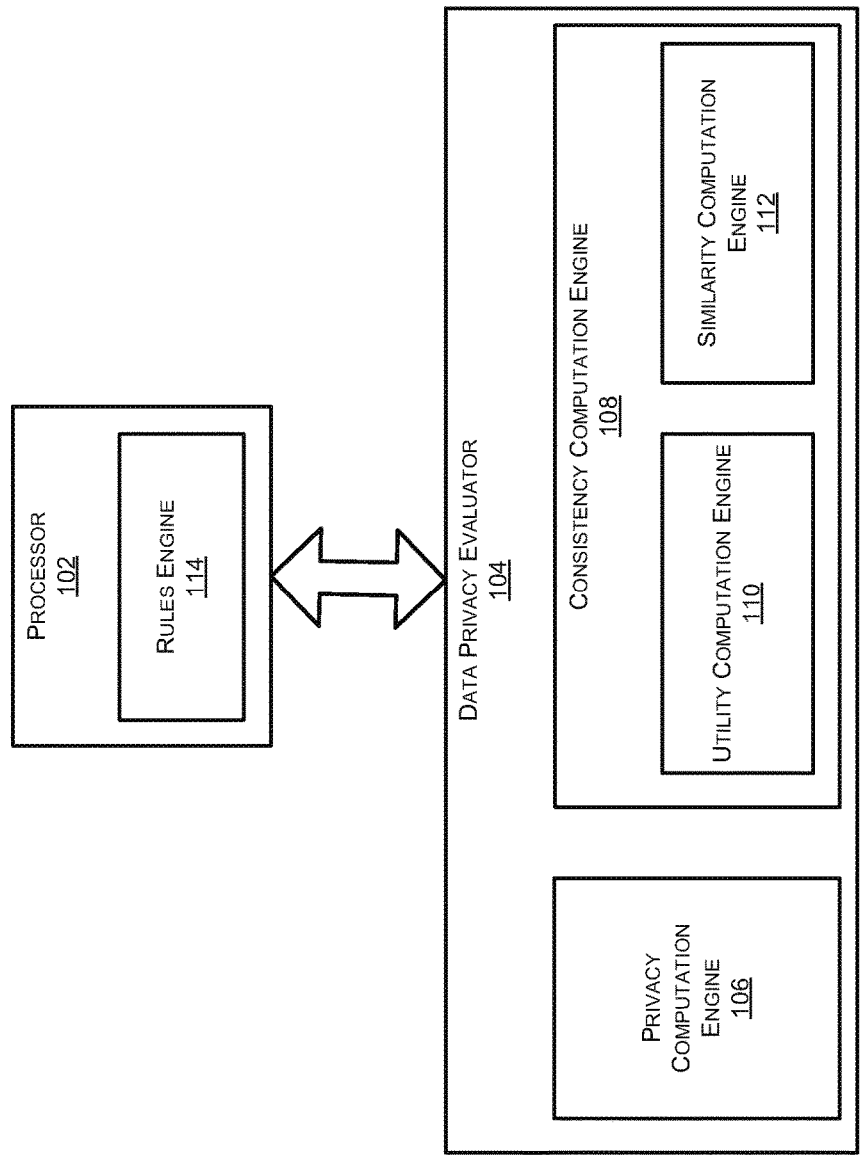
FIG. 1 illustrates a system for facilitating a rule-based anonymization of an original dataset, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe providing a solution in the form of a system and a method for facilitating a rule-based anonymization of an original dataset. The system may include a processor and a rules engine. The processor may include a data privacy evaluator. The data privacy evaluator may receive an original dataset pertaining to a domain from a raw data repository associated with the system. The data privacy evaluator may receive, at least one anonymized dataset corresponding to a predefined strategy of anonymization. The at least one anonymized dataset may include a variation from the original dataset by at least one of a privacy metric and a consistency metric. The privacy metric may pertain to a risk of re-identification of an information. The information may pertain to an entity in the at least one anonymized dataset corresponding to the original dataset. The consistency metric may pertain to a combination of a utility metric and a similarity metric. The data privacy evaluator may evaluate the at least one anonymized dataset with respect to the original dataset through a privacy computation engine of the processor. The evaluation may generate a first output corresponding to the privacy metric. The data privacy evaluator may evaluate the at least one anonymized dataset with respect to the original dataset through a consistency computation engine of the processor. The evaluation may generate a second output corresponding to the consistency metric. The data privacy evaluator may generate a final output value indicating an extent of the variation of the at least one anonymized dataset with respect to the original dataset. The final output value may be generated based on the first output and the second output.

Exemplary embodiments of the present disclosure have been described in the framework of for facilitating a rule-based anonymization of an original dataset. The embodiments may describe a system and a method that may automatically indicate or recommend if an anonymized dataset if protected enough as well as has sufficient utility. This may provide better clarity if a predefined strategy of anonymization used is effective or not. Further, the system and method of the present disclosure may allow a rule based access to the anonymized dataset. This means that an external system/database may be allowed access to only those anonymized datasets that have a final output value and/or other metrics (first output and/or second output) beyond a certain threshold. The system and method may also send an automated communication to an anonymization engine (that may generate the anonymized dataset from the original dataset) to alter the predefined strategy of anonymization. The present disclosure thus may be able to provide a concrete outcome in form of a measurable value to indicate an extent of privacy protection in an anonymized dataset. Further, in addition to privacy protection insights, the present disclosure also provides an understanding on utility of anonymized datasets. The system and method of the present disclosure may also configure an automated feedback based on which anonymized datasets may be generated with a modified strategy. The system and method of the present disclosure may be applied to several data consuming applications, such as, for example, extract-transform-load (ETL), analytics, reporting, artificial Intelligence, public repository and other such applications. However, one of ordinary skill in the art will appreciate that the present disclosure may not be limited to such applications. The system may be integrated with the data consuming application to meet compliance requirements, avoid privacy costs associated with improper handling of data, better implementation of data ownership and data monetization application. The automated feedback for generating new anonymized datasets may be based on alternate strategy of anonymization. The solution of the present disclosure may thus facilitate choosing the right anonymization strategy that fits the needs of an individual/organization according to data type, re-identification context and the future utility of the anonymized data. The present disclosure may also provide a strategic tool to make the right decision based on quantitative facts. Several other advantages may be realized.

FIG. 1 illustrates a system 100 for facilitating a rule-based anonymization of an original dataset, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor may include a data privacy evaluator 104 and a rules engine 114. The data privacy evaluator 104 may a privacy computation engine 106 and a consistency computation engine 108. The consistency computation engine 108 may include a utility computation engine 110 and a similarity computation engine 112.

The system 100 may be a hardware device including the processor 102 executing machine readable program instructions to facilitate a rule-based anonymization of an original dataset. Execution of the machine readable program instructions by the processor 102 may enable the proposed system to facilitate a rule-based anonymization of an original dataset. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

The data privacy evaluator 104 may receive an original dataset pertaining to a domain i.e. a field pertaining to the original dataset. The data privacy evaluator 104 may receive the original dataset from a raw data repository associated with the system. The data privacy evaluator 104 may receive at least one anonymized dataset corresponding to a predefined strategy of anonymization. The at least one anonymized dataset may include a variation from the original dataset by at least one of a privacy metric and a consistency metric. The privacy metric may pertain to a risk of re-identification of an information. The information may pertain to an entity in the at least one anonymized dataset corresponding to the original dataset. The term "entity" may refer to at least one of an individual, a group of individuals, an organization and a group of organizations, related to the information in the original dataset. The consistency metric may pertain to a combination of a utility metric and a similarity metric. The data privacy evaluator 104 may evaluate the at least one anonymized dataset with respect to the original dataset through the privacy computation engine 106 to generate a first output. The first output may correspond to the privacy metric. The data privacy evaluator 104 may evaluate the at least one anonymized dataset with respect to the original dataset through the consistency computation engine 108 to generate a second output. The second output may correspond to the consistency metric. Based on the first output and the second output, the processor may generate a final output value (hereinafter also referred to as final output or global computation or evaluation results). The final output value may indicate an extent of the variation of the at least one anonymized dataset with respect to the original dataset.

Figure 2:
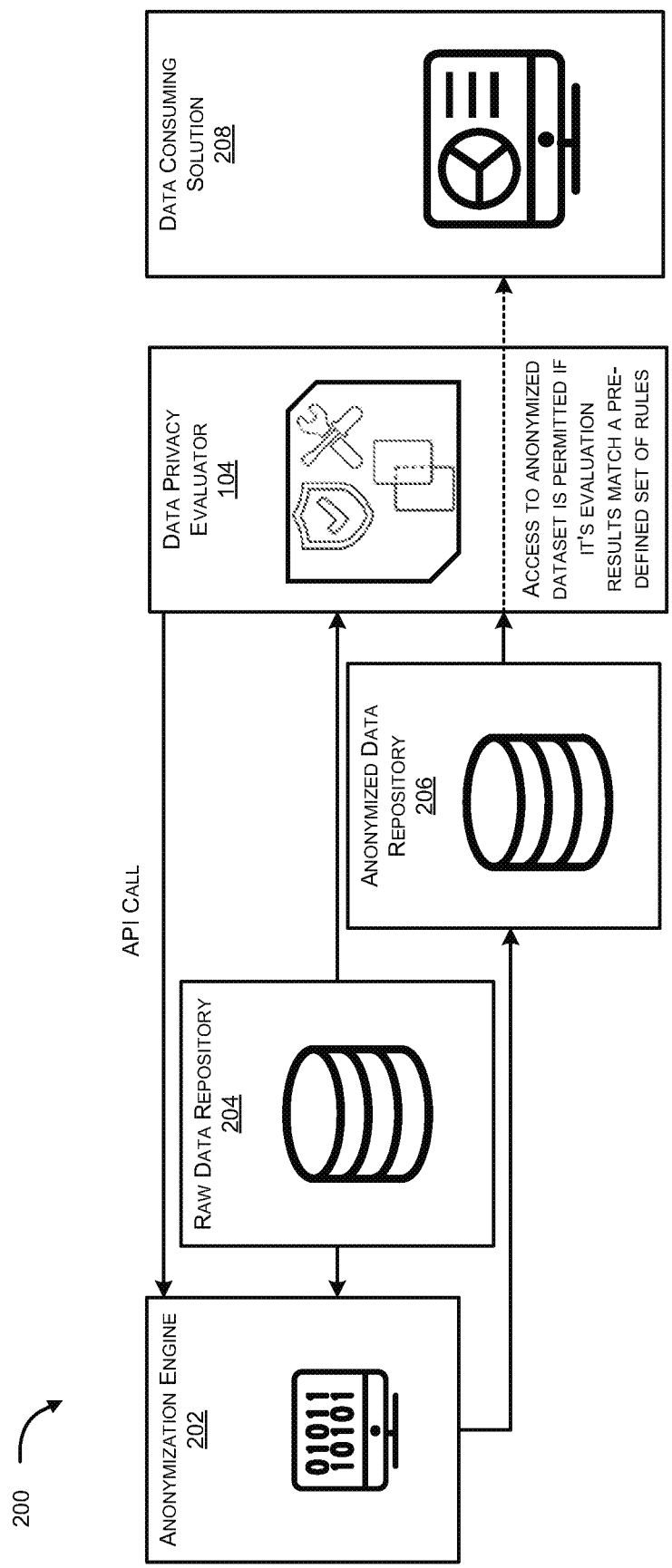
FIG. 2 illustrates an overview for an implementation including components of the system of FIG. 1, according to an example embodiment of the present disclosure.

FIG. 2 illustrates an overview 200 for an implementation including components of the system of FIG. 1 in an, according to an example embodiment of the present disclosure. As illustrated in FIG. 2, the processor (data privacy evaluator 104) may be coupled with an anonymization engine 202. The anonymization engine 202 may generate the at least one anonymized dataset from the original dataset received from a raw data repository 204. In an example embodiment, the anonymization engine 202 may include an implementation to render selective information in the original dataset as anonymous or hidden. The implementation may include at least one of data generalization, such as, for example, k-anonymity, t-closeness, l-diversity, and synthetic data generation or other such techniques. In an example embodiment, the raw data repository 204 and the anonymized data repository 206 may include pre-stored original datasets and anonymized datasets respectively. The raw data repository 204 and the anonymized data repository 206 may pertain to at least one of a database, a file, a data warehouse, a cloud-based data and other such pre-stored data. The anonymization engine 202 may generate the at least one anonymized dataset corresponding to the predefined strategy of anonymization.

The data privacy evaluator 104 may receive the anonymized dataset from at least one of the anonymization engine 202 and the anonymized data repository 206. In an example embodiment, the anonymization engine 202 may convert the original dataset (received from raw repository 204) into one or more anonymized datasets that may be stored in the anonymized data repository 206. The data privacy evaluator 104 may receive the original dataset from the raw data repository 204 and the anonymized datasets from the anonymization engine 202. In an example embodiment and in reference to FIGS. 1 and 2, the processor 102 may determine the final output value with respect to a predefined threshold. The final output value may be determined through a rules engine 114 of the system 100, based on a first set of predefined rules. In an example embodiment, if the final output value may be equal or higher than the predefined threshold, the system may permit an access of the anonymized dataset to an external system. In an example embodiment, the access to the anonymized dataset may be permitted to the external system such as data consuming solution 208 only if evaluation results from the data privacy evaluator matches the first set of pre-defined rules. In an example embodiment, the processor 102 may assess each of the first output (pertaining to privacy metric), the second output (pertaining to consistency metric) and the final output value and allow the anonymized dataset to be accessed only if each of the first output, the second output and the final output value is equal or above an independent predefined threshold value. In another example embodiment, the processor 102 may allow the anonymized dataset to be accessed only if at least one of the first output, the second output and the final output value is equal or above the independent predefined threshold value. The system 100 may automatically determine which metric or output to be considered based on the first predefined rules. The first set of predefined rules may be manually or automatically set by the system 100. The first set of predefined rules may ensure that both privacy and utility of the anonymized datasets are taken into consideration along with other pre-requisites such as user requirements, domain type, purpose of anonymization and other such factors. In an example embodiment, the data consuming solution 208 may include at least one solution, such as, for example, extract-transform-load (ETL), analytics, reporting, artificial Intelligence, public repository and other such applications.

In another example embodiment, if the final output value may be less than the predefined threshold, the system 100 may perform at least one action. The at least one action may include an alert generation and/or an automated communication of a feedback. In an example embodiment, the alert generation may indicate that the pre-defined strategy of anonymization is insufficient to provide desired privacy protection of the original dataset. For example, the alert generation may occur on a user interface so that a user may be notified or recommended that the anonymized dataset is not protected enough. In an example embodiment, if the final output value may be less than the predefined threshold, the feedback may be automatically communicated by the data privacy evaluator 104 to the anonymization engine 202. The feedback may be sent to the anonymization engine 202 and may indicate a request or a requirement to generate an alternative anonymized dataset for the corresponding original dataset based on an alternative strategy of anonymization. In another embodiment, based on the feedback, the system 100 may verify if the alternative anonymized dataset is already present in the anonymized data repository 206. For example, if available, the system 100 may retrieve the alternative anonymized dataset from the anonymized data repository 206. For example, if the alternative anonymized dataset may not be available then the data privacy evaluator 104 may communicate the request to the anonymization engine 202 through an application programming interface (API) call. In another example embodiment, the at least one action may be performed if at least one of the first output, the second output and the final output value is equal or above the independent predefined threshold value, based on the first set of predefined rules. In an example embodiment, the first set of predefined rules may be at least one of default and customized. The respective independent predefined threshold value may be set based on the first set of predefined rules.

Figure 3:
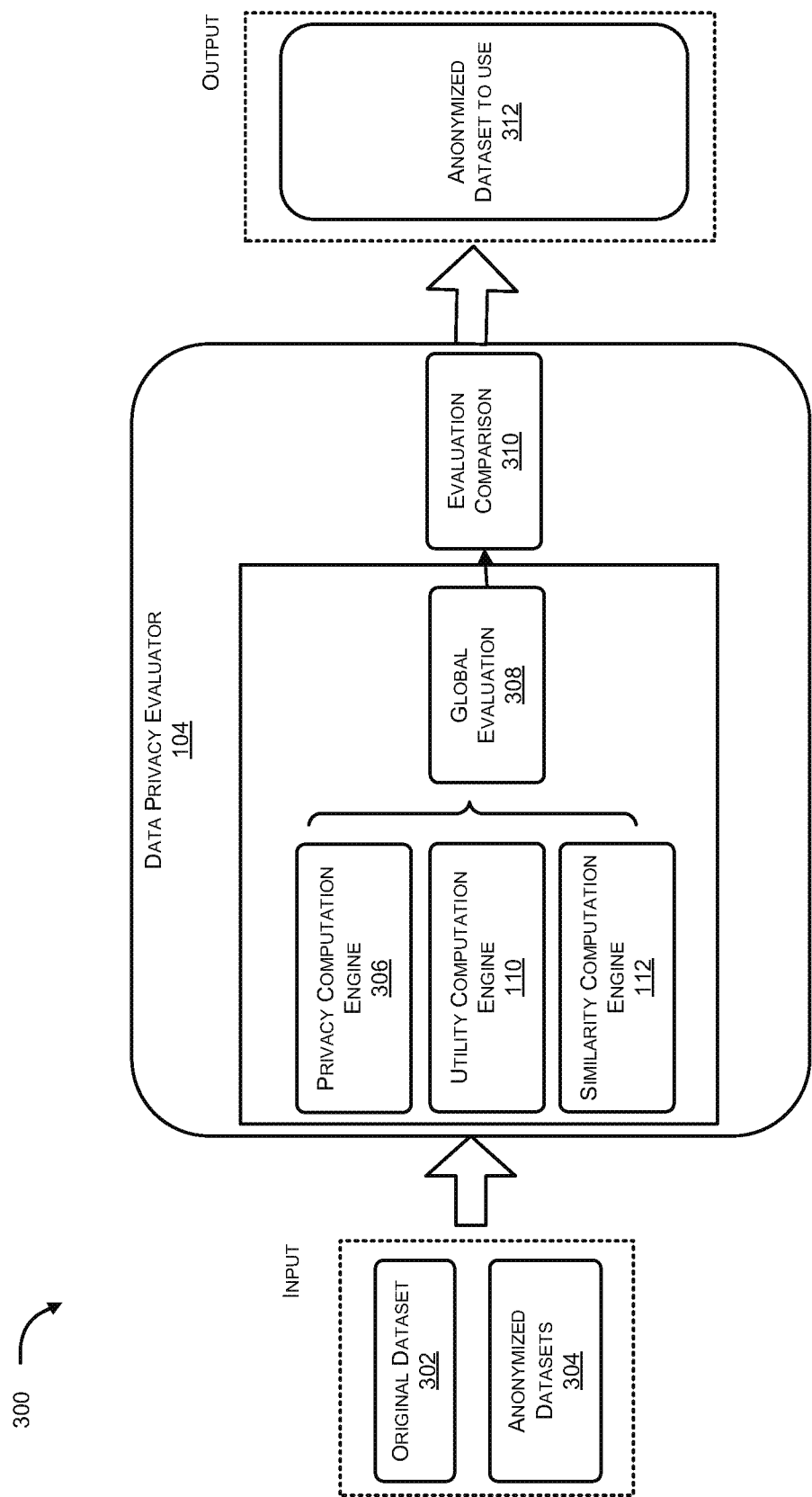
FIG. 3 illustrates an example overview showing an overall process of evaluation by the data privacy evaluator of FIG. 1, according to an example embodiment of the present disclosure.

In an example embodiment, the anonymization engine 202 may generate multiple anonymized datasets. Each of the multiple anonymized datasets may include different pre-defined strategies for anonymization. The multiple anonymized datasets may be stored in the anonymized data repository 206. The processor may evaluate the multiple anonymized datasets to identify a suitability of anonymization including an optimal value of at least one of the privacy metric and the consistency metric. In an example embodiment, the processor may perform an evaluation comparison by comparing at least one of the first output, the second output and the final output value of the multiple anonymized datasets. Based on the evaluation comparison, the processor may recommend an endorsed anonymized dataset from the multiple anonymized datasets. The endorsed anonymized dataset may include the most optimal value of at least one of the privacy metric and the consistency metric in comparison to other datasets in the multiple anonymized datasets. FIG. 3 illustrates an example overview 300 showing an overall process of evaluation by the data privacy evaluator of FIG. 1, according to an example embodiment of the present disclosure. As shown in FIG. 3, an input may be provided to the data privacy evaluator 104. The input may include an original dataset 302 and multiple anonymized datasets 304. The input may be received from at least one repository as explained in FIG. 2. The input may be processed by the data privacy evaluator 104 using the privacy computation engine 306, the utility computation engine 110 and the similarity computation engine 112, as explained in FIG. 1. In an example embodiment, the multiple anonymized datasets 306 may include different anonymized versions of the original dataset that may be compared to check the best suitable anonymized dataset. The data privacy evaluator 104 may evaluate each of the multiple anonymized datasets 306. Based on the evaluation, generate a first output pertaining to privacy metric through the privacy computation engine 306. The privacy metric may pertain to a risk of re-identification of an information pertaining to an entity in the at least one anonymized dataset corresponding to the original dataset. The risk of re-identification may indicate that the information can be used, alone or in combination with other reasonably available information, by an anticipated recipient to identify the entity (or individual) who is a subject of the information. By anonymizing the relevant and required information as per the strategy of anonymization, the risk of re-identification may be reduced. The data privacy evaluator 104 may generate a second output pertaining to consistency metric. The consistency metric pertains to a combination of the utility metric and the similarity metric. Thus the second output may include a predetermined percentage of the utility metric and the similarity metric. In the context of anonymization, the utility metric may pertain to usefulness of the anonymized data for predictive tasks or a predictive performance using the anonymized dataset in comparison to the original dataset. For example, the predictive performance of the original dataset may be compared to respective anonymized datasets by re-modelling a machine learning algorithm on each dataset and measuring respective performance through predefined techniques. In the context of anonymization, the similarity metric may pertain to a technique to ensure that the anonymized dataset is still useful for statistical analysis. By assessing the similarity between the anonymized dataset in comparison to the original dataset, it may be evaluated if the anonymized data may own the same level of statistical significance as the original dataset. In an example embodiment, the data privacy evaluator 104 may generate the final output value based on weighted sum of the each of the first output and the second output. The weighted sum may be determined by independent weights assigned to each metric by the rules engine based on a second set of predefined rules that depends on at least one of the domain and a purpose of anonymization.

The final output value may pertain to a global evaluation 308 that may reflect the trade-off between the privacy metric, the utility metric and the similarity metric. The data privacy evaluator 104 may then perform an evaluation comparison 310 to compare evaluation results corresponding to the multiple anonymized datasets 306. The trade-off between these three metrics may be considered as a basis for the processor 102 to choose the best anonymization strategy that may facilitate to choose the most suitable anonymized dataset 312 as an output.

FIGS. 4A-4E illustrate overview for one or more aspects of computation by a privacy computation engine of the system 100 of FIG. 1, according to an example embodiment of the present disclosure. The privacy computation engine generates a first output pertaining to privacy metric. The privacy metric pertains to a risk of re-identification of an information pertaining to an entity in the at least one anonymized dataset corresponding to the original dataset. The risk of re-identification pertains to extent of anticipation of the information pertaining to the entity in the at least one anonymized dataset. In an example embodiment, the privacy computation engine evaluates the privacy metric in the at least one anonymized dataset to identify at least one of an identifier, a quasi-identifier, a sensitive attribute and a neutral attribute. The identifier may correspond to a mode of unambiguous re-identification of the entity. For example, attributes such as passport number, social security number, full name of an entity (individual and/or organization) may be sufficient to definitely re-identify the entity without need for other details. The quasi identifier may pertain to a variable which, in combination with another variable, may facilitate possible re-identification of the entity. For example, attributes such as a ZIP code, gender, date of birth of an entity, in combination with each other or other variables may facilitate possible re-identification of the entity. The sensitive attribute may relate to a confidential information pertaining to the entity. For example, the medical condition of an individual may be a sensitive attribute and hence such attributes may need to be kept private. The neutral attribute may be devoid of the identifier, the quasi-identifier and the sensitive attribute. Thus, the neutral attribute may include microdata records that may neither belong to any of the above categories.

In an example embodiment, the privacy computation engine evaluates the privacy metric in the at least one anonymized dataset to automatically identify the quasi-identifiers. The identification of the quasi-identifiers may be based on a domain-based pre-stored library of commonly recognized quasi-identifiers to determine the features that can be considered as quasi-identifiers that may vary with domain. In another example embodiment, the identification of the quasi-identifiers may be manually performed by the user. FIG. 4B illustrates an overview 420 of an exemplary tabular data from the anonymized dataset, according to an example embodiment of the present disclosure. As seen in FIG. 4B, the anonymized dataset corresponds an anonymized version of the original dataset i.e. an open-source dataset with a huge record, for example, a total of 10000 records. As shown in FIG. 4B, the anonymized dataset may include various attributes, such as, for example, details pertaining to age, ethnicity, gender, marital status, educational details, working hours (hours per week), country and income beyond a certain value. The objective or purpose of anonymization may be to avoid revealing the actual name and details of the people who have yearly income below or above 50000 dollars. As seen in the table in FIG. 4B, the income of individuals below 50000 dollars is indicated as 0 and above 50000 dollars is indicated as 1. The anonymized dataset may reveal the actual name of the individuals but still can be seen to include variables such as age, gender and marital status that can be considered as quasi-identifiers, as these variables, in combination with each other or with other variables, can possibly enable re-identification of the individuals. In this example, the privacy computation engine may mainly classify the attributes as quasi-identifiers, the sensitive attributes and the neutral attributes as there are no identifiers in the dataset. It may be appreciated that the quasi-identifiers may vary with the domain or purpose of anonymization. In this example, age and gender may be commonly used quasi-identifiers but marital status may be less used. However, marital status is selected in this example as this kind of information can be publicly available and, in combination with external information, can make it possible to re-identify an individual. FIG. 4C illustrates an overview (440) displaying an exemplary table with variables 442 (hereinafter interchangeably referred to as "features") and the attributes (444) assigned to the variables. As seen in FIG. 4C, the variables such as age, gender and marital status are identified as quasi-identifiers. The variables such as ethnicity, educational details and income are identified as sensitive information, wherein the income variable being the target related to the purpose of anonymization. The variables such as hours per week and the country may be neutral attributes as they do not pertain to any of the other attributes.

In an example embodiment, the privacy computation engine may selectively designate an equivalence class (EC) pertaining to the identified quasi-identifier. The EC may correspond to a set of records that may be indistinguishable from each other with respect to the quasi-identifier. The privacy computation engine may then extract a selected set of EC from the plurality of EC. The selected set of EC may be extracted based on a predefined factor. The selected set of EC may pertain to a set of scattered records that may be incompatible with a predefined criterion associated with the predefined factor. The predefined factor may include, without limitation, at least one of a predefined k-factor to check k-anonymity of the anonymized dataset, predefined l-factor to check l-diversity principle corresponding to the anonymized dataset and predefined t-factor to check t-closeness factor in the anonymized dataset. Various other type of factors can also be implemented. The predefined factor may include a range or a value that is specific to the domain. In an example embodiment, the range or the value of the predefined factor may be automatically set by the data privacy evaluator, wherein the range or the value of the predefined factor may be based on predefined rules stored in the rules engine. In another example embodiment, the range or the value of the predefined factor may be manually updated. In an embodiment, the pre-defined k-factor corresponds to k-anonymity or k-anonymous dataset. A dataset is considered as k-anonymous if information for each entity contained in the anonymized dataset cannot be distinguished from at least k−1 entities whose information also appear in the dataset. If the anonymized dataset satisfies k-anonymity for some value k, then based on the quasi-identifiers corresponding to the entity in the anonymized dataset, a record pertaining to that entity cannot be identified with confidence greater than 1/k. FIG. 4D illustrates an overview 460 of group of EC extracted by the privacy computation engine, according to an example embodiment of the present disclosure. As seen in FIG. 4D, the group of EC pertaining to identified quasi-identifiers is extracted to obtain set of scattered records (5 records). In one group of EC (for example entry 3 with 3 records) indicates that 3 groups of EC may be obtained in which each group may pertain to 52 EC each and 156 records each. For obtaining the scattered records, the predefined k-factor may be considered as 5 in this case. This means that all records less than 5 (i.e. k−1) may be considered to be scattered records. Based on this, all first four entries (i.e. excluding the last entry with 5 records) is considered as scattered records. Thus, in overall, in the present example, 799 EC may be drawn, out of which 39% EC (equal to 314 EC) were considered as scattered records (containing less than 5 records), representing 870 records (9% of the dataset). It may be appreciated that the system can identify a domain from various attributes of the anonymized dataset such that based on the identified domain, the pre-defined k factor may be recommended by the system. For example, in the medical domain, a k between 5 and 15 may be used to ensure that the data is protected. In the present example (shown in FIG. 4D), as the anonymized dataset is associated with financial domain, the pre-defined k factor may be considered as 5. In an example embodiment, the pre-defined k-factor may be determined based on commonly used k-factors pertaining to the domain of the original dataset that may be entered manually or determined automatically by the system.

Once the set of scattered records may be identified, the privacy computation engine may then identify a set of identified records from the set of scattered records. The set of identified records may include a re-identification risk beyond a predefined privacy threshold. This may indicate that the set of identified records may be vulnerable in term of re-identification risk as they may have proximity with the corresponding records in the original dataset. FIG. 4A illustrates an overview 400 to display the set of identified records, according to an example embodiment of the present disclosure. As seen in FIG. 4A, the circle 402 may indicate plurality of records from which the set of scattered records 404 may be obtained. Further, from within the set of scattered records 404, the records with re-identification risk 406 (set of identified records) may be identified.

The privacy computation engine may identify the set of identified records by independently computing an Euclidian distance for each record corresponding to the set of scattered records and each quasi-identifier corresponding to the set of scattered records based on respective records in the original dataset. In an example embodiment, the Euclidian distance may be computed by performing a closeness analysis. The closeness analysis based on the Euclidian distance may be performed to evaluate at least one of a global closeness score and a quasi-identifier based closeness score. The global closeness score may correspond to an evaluation result obtained by computing the Euclidian distance between each record corresponding to the set of scattered records and respective record in the original dataset. In an example embodiment, the Euclidian distance may be computed by performing the closeness analysis on at least one pair including the record from the set of scattered records and the corresponding original record. The quasi-identifier based closeness score may correspond to an evaluation result obtained by computing the Euclidian distance between each quasi-identifier corresponding to the set of scattered records and the respective record in the original dataset. In an example embodiment, the Euclidian distance may be computed by performing the closeness analysis on at least one pair including the record pertaining to the quasi-identifier and the respective original record. In an example embodiment, the independent computation of the Euclidian distance for the set of scattered records and the quasi-identifiers may be done parallelly. In another example embodiment, the computation of the Euclidian distance for the set of scattered records may be performed first, followed by re-computation of the Euclidian distance for the quasi-identifiers. In an embodiment, the set of identified records may be obtained by assessing if at least one of the global closeness score and the quasi-identifier based closeness score lies above a respective privacy threshold. Thus the set of identified records may be obtained by recognizing the pair that include smallest Euclidian distance between an anonymized record and the corresponding original record. In an example embodiment, the set of identified records may be obtained by identifying and extracting a first group of records ($SR_{global}$) that include the global closeness score above a first privacy threshold (PT1). In another example embodiment, the set of identified records may be obtained by identifying and extracting a second group of records ($SR_{QI}$) that include the quasi-identifier based closeness score above a second privacy threshold (PT2). In yet another example embodiment, the set of identified records may be obtained based on a union of the first group of records and the second group of records. The union may correspond to a combination of the first group of records and the second group of records after removing duplicated records present therein. In an example embodiment, the data privacy evaluator may allow the user to access the set of identified records based on a pre-authorization. The set of identified records may be accessed by the user for manual evaluation or assessment.

Figure 4E:
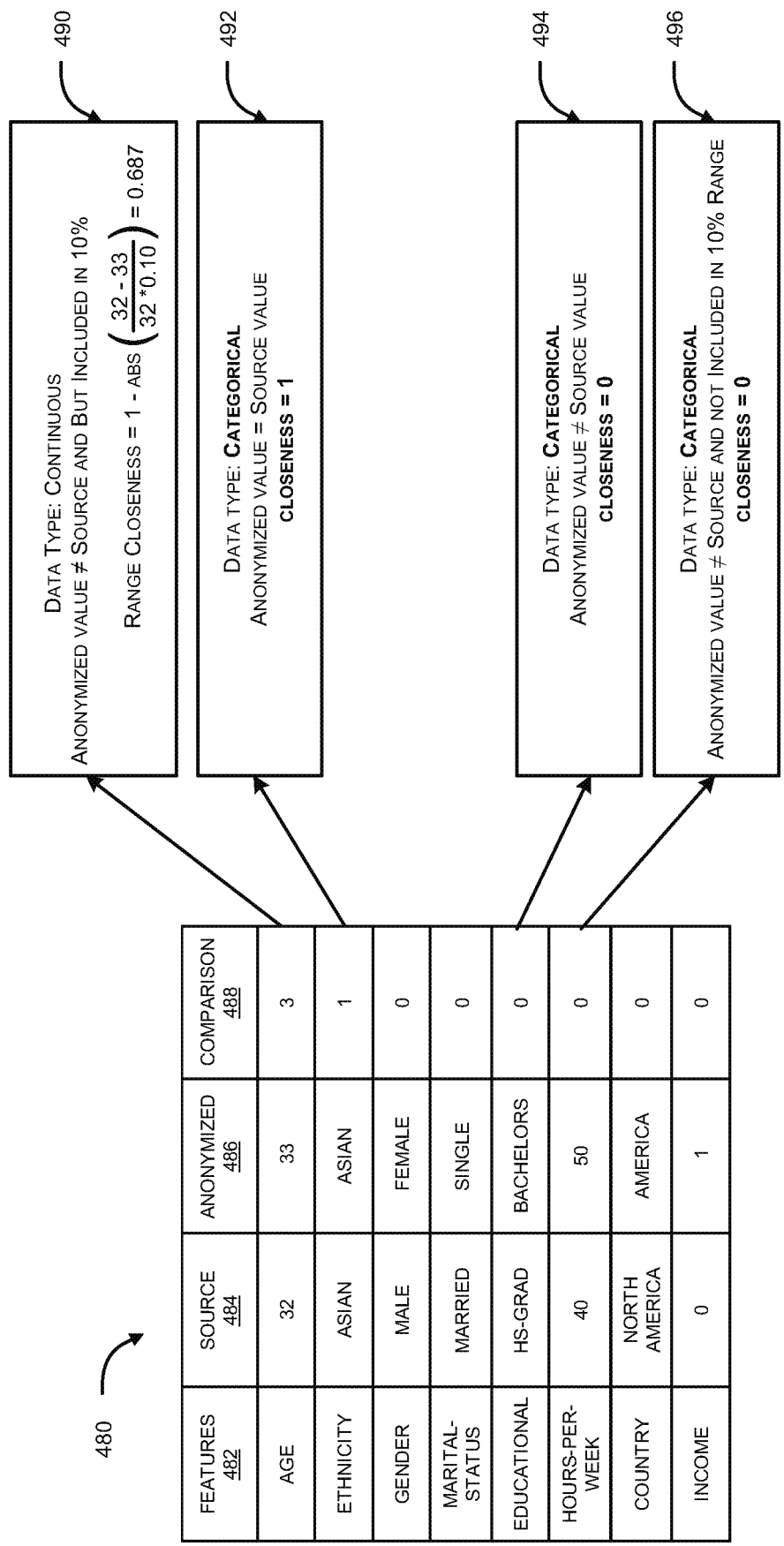

The computing of the Euclidian distance thus enables to identify the pair that has closeness based on privacy thresholds and thus have a risk of reidentification. In an example embodiment, in the computation of the Euclidian distance, closeness analysis may be performed on each pair (such as original record, anonymized record from scattered records or quasi-identifiers) based on which the privacy computation engine may compare different feature values with a pre-defined set of rules, as explained hereinbelow. FIG. 4E illustrates an overview 480 indicating the closeness computation, according to an example embodiment of the present disclosure. As shown in FIG. 4E, the overview 480 depicts a tabular data pertaining to variables/features 482, corresponding record pertaining to the features in original dataset indicated as source (484), respective record in the anonymized dataset 486 and the closeness computation based evaluation 488. In an example embodiment, discrete values (categorical) may be chosen such that if anonymized record in the pair may match with the original record, then closeness may be set to 1. This type of evaluation may be observed in case of numeral 492, wherein the original record and respective anonymized records (the ethnicity being Asian) match exactly to assign a closeness as 1. In another example embodiment, discrete values (categorical) may be chosen such that if anonymized record does not match with the original record then closeness may be set to 0. This type of evaluation may be observed in case of numeral 494, wherein original and respective anonymized records (the educational details being different) differ completely to assign a closeness as 0. In another example embodiment, continuous values may be chosen such that if anonymized record may match with the original record then closeness may be set to 1. In another example embodiment, continuous values may be chosen such that if the anonymized record is in a predefined range such as [original record−10%, original record+10%] range, then closeness may be set as:

$$1 - \text{abs}\left(\frac{\text{original value} - \text{anonymized value}}{\text{original value} * 0.10}\right)$$

This type of evaluation may be observed in case of numeral 490, wherein original and respective anonymized records (feature as age) fall within the range as closeness is found to be 0.65. In another embodiment, if the closeness may not be in the above mentioned predefined range then the closeness may be set to 0. This type of evaluation may be observed in case of numeral 496, wherein original and respective anonymized records (hours per week being different) do not fall in 10% range and hence the closeness is 0. In an example embodiment, the global closeness score may be evaluated as a ratio of the sum of closeness to the number of variables in the plurality of records. In reference to FIG. 4E and in an example embodiment, the sum of the closeness is found to be 1.687 (1+0+0.687+0=1.687) and the number of total variables/features correspond to 8 (a total of 8 features in the table of FIG. 4E). The global score closeness may be computed as $$\frac{\sum \text{closeness}}{\text{Number of features}} = \frac{1.687}{8} = 0.21$$

In reference to FIG. 4E and in another example embodiment, it is observed that out of 870 scattered records (as concluded from FIG. 4D), 139 records have a global closeness score below a first privacy threshold PT1 so 16% of the scattered records may be at risk, representing 4% of the anonymized dataset. Similarly, the quasi-identifier based closeness score may be a ratio of the sum of closeness to the number of quasi-identifiers in the plurality of records. In accordance with the present disclosure, the closeness scores can be compared with respective privacy thresholds (PT1/PT2) to identify the number of records at risk (privacy metric). Various other modes/rules may also be used.

In an example embodiment, the privacy computation engine may compute the first output (pertaining to privacy metric) by calculating a ratio of the set of identified records to the plurality of records. The first output corresponds to the privacy metric and indicates a percentage of the plurality of records that include the risk of re-identification. In an embodiment, the first output corresponds to a privacy score based on a privacy risk that considers at least one of the global closeness score and the quasi-identifier based closeness score with varying predefined privacy threshold. In an example embodiment, the privacy risk may be based on at least one of the first group of records i.e $SR_{global}$ (global closeness score above threshold PT1) and the second group of records i.e. $SR_{QI}$ (quasi-identifier based closeness score above threshold PT2). The privacy risk may be calculated by taking a ratio of the union of the first group of records ($SR_{global}$) and the second group of records ($SR_{QI}$) to a total number of records in the anonymized dataset. Based on the privacy risk, the privacy score may be calculated as:

$$\text{Privacy Score} = (1 - \text{privacy risk}) * 100$$

$$\text{wherein Privacy Risk} = \frac{\text{number of records in the union of } SR_{global} \text{ and } SR_{QI}}{\text{total number of records in the anonymized dataset}}$$

For example, out of a total number of records, the set of scattered records may be 870 such that the data privacy evaluator can identify and extract the 150 records as the first group of records ($SR_{global}$) having global closeness score above threshold PT1 and 300 records as the second group of records i.e. ($SR_{QI}$) having quasi-identifier based closeness score above threshold PT2. The union of $SR_{global}$ and $SR_{QI}$ may be calculated to obtain 350 records (among 450 records as the set of identified records, wherein 100 records are duplicate records). Based on this number and also based on the above mentioned equation, the privacy risk and privacy score can be calculated as followed:

$$\text{Privacy risk} = \frac{350}{10000}$$

$$\text{Privacy Score} = (1 - 0.035) * 100 = 96.5\%$$

In an example embodiment, the second output corresponding to the consistency metric includes a predetermined percentage of the utility metric and the similarity metric. The utility metric may correspond to a utility score that can be determined by analyzing a predictive performance of the at least one anonymized dataset in comparison to the original dataset. The predictive performance pertains to a predicting ability of a machine learning (ML) model that is trained using the anonymized dataset. The predictive performance may be based on at least one of an accuracy and a weighted score pertaining to precision and recall. In an example embodiment, the weighted score may pertain to F1-score. A score related to utility metric may be based on accuracy or F1-score or may be used in combination based on the requirements of the ML model. In an example embodiment, the accuracy may be considered in isolation for a regression problem related to the ML model. It may be common that several accuracy based metrics may be used according to the use case such as for example, Mean Absolute Error (MAE), Mean Absolute Percentage Error (MAPE), Root Mean Square Error ((RMSE), Mean Square Error (MSE) and other such techniques. In the present example, the accuracy can be estimated using MSE as, $MSE = 1/n \ \Sigma(y-y')^2$ In another example embodiment, the ML model may be addressing a classification problem for which accuracy may be determined as $$\text{Accuracy} = \frac{\text{Total number of correct predictions}}{\text{Total predictions}} = \frac{TP + TN}{TP + FP + TN + FN}$$

In an example embodiment, the anonymized dataset may be assessed to check the utility metric depending on the ML model and/or the type of problem being solved/approach used such as, for example, classification or regression. The technique may be based on default chosen algorithm or algorithm chosen by a user. For example, in case of regression, only the accuracy may be retrieved. In another example, in case of the classification, both the accuracy and the F1 score will be consolidated to display a global score. The F1 score or F measure (F score) is a measure of an accuracy of a test and is defined as the weighted harmonic mean of the precision and recall of the test and may be expressed as:

$$F1 \ \text{Score} = 2 * \frac{\text{Precision} * \text{Recall}}{\text{Precision} + \text{Recall}}$$

The term "recall" may refer to percentage of total relevant results correctly classified by the algorithm and may be expressed as:

$$\text{Recall} = \frac{\text{True positive}}{\text{True positive} + \text{False positive}}$$

The term "precision" may refer to percentage of results which are relevant and may be expressed as:

$$\text{Precision} = \frac{\text{True positive}}{\text{True positive} + \text{False negative}}$$

In an example embodiment, it may also be possible to complement the utility metric with Area Under Curve (AUC) metrics such as, for example, Area Under Receiver Operator Characteristic Curve (AUROC) and Area Under the Precision-Recall Curve (AUPRC). In an example embodiment, to compare the predictive performance of the original dataset in comparison to the corresponding anonymized dataset, a machine learning algorithm may be remodeled independently on each of the original dataset and the corresponding anonymized dataset to measure performance. For example, for a classification problem, evaluation of at least one of the Accuracy and the F1-Score can be performed. In an example, if the evaluation is performed based on the Accuracy and the F1-Score, then the utility metric may be determined by evaluating the utility score. The utility score may be computed by taking a weighted sum of the ratios pertaining to the Accuracy and the F1-Score with respect to the anonymized dataset and the original dataset. For an exemplary weight value of 0.5, and for a given example exhibiting the following results as provided below in Table 1, the utility score may be computed as shown hereinbelow:

TABLE 1

Example of values for Accuracy and F1-Score

|  | Model trained on original dataset | Model trained on anonymized dataset |
|---|---|---|
| Accuracy | 81.7% | 75.2% |
| F1-Score | 67.8% | 63.5% |

$$\text{Utility score} = \left(0.5 * \frac{\text{Accuracy anonymized data}}{\text{Accuracy original data}} + 0.5 * \frac{F1 \text{ Score anonymized data}}{F1 \text{ Score original data}}\right) * 100$$

$$\text{Utility score} = \left(0.5 * \frac{75.2}{81.7} + 0.5 * \frac{63.5}{67.8}\right) * 100 = (0.5 * 0.92 + 0.5 * 0.93) * 100 = 92.5\%.$$

The consistency metric also includes the similarity metric (apart from utility metric). The similarity metric may correspond to a similarity score that pertains to an extent of a statistical similarity between the at least one anonymized dataset and the original dataset. In an example embodiment, the similarity metric may be determined between two probability distributions computed using a statistical test. In an example embodiment, to compute the similarity score, for each variable present in the anonymized dataset, a divergence may be computed between an anonymized feature in the anonymized dataset and a corresponding original feature in the respective original dataset. The divergence can be computed using at least one of a Kolmogorov-Smirnov (KS) divergence test, Kullback-Leibler (KL) divergence test, entropy test, and the Wassertein distance based evaluation. In an example embodiment, the KS test may be used. The KS test may be a very efficient technique to determine if two samples are significantly different from each other. The KS test statistics quantifies the distance between the empirical distribution function of two samples. Upon computation of the divergence, if it may be concluded that the divergence is below a predefined threshold $S_t$, then the distribution may be considered as similar i.e. the anonymized feature and the original feature may be considered to be similar. Based on this, the similarity score may be calculated as ratio of sum of similar features to the total number of features being evaluated:

$$\text{Similarity score} = \frac{\sum \text{similar features}}{\text{Number of features}} * 100$$

For example, for a predefined threshold St=0.5, if the anonymized dataset includes 5 variables/features out of which only 3 features have the divergence below the predefined threshold of 0.5, then the number of similar features is 3. Using the above equation, the similarity score can be derived as 60%.

In another example, for a predefined threshold St=0.5, if among 8 variables/features, the divergence is computed between the anonymized dataset and the original dataset such that only 2 features/variables such as, for example, educational and age have a divergence above 0.5, then the similarity score can be calculated as:

similarity score=(1−2/8)*100=75%

In another example embodiment, the system may rely on at least one of summary statistics (such as mean, variance, median, mode, minimum and maximum), analysis of distributions and bi-joint distributions, correlation matrices analyses with Pearson coefficient and other metrics such as, for example, entropy.

In an example embodiment, the data privacy evaluator generates the final output value based on weighted sum of the each of the first output and the second output. The weighted sum is associated with a predefined weight that is assigned to each of the privacy metric, utility metric and the similarity metric. The predefined weight may be determined by the rules engine based on a second set of predefined rules that depends on at least one of the domain and a purpose of anonymization. In an example embodiment, the final output value (or global computation) may be determined as shown below:

Final output (Global computation)=$w_{privacy}$×Privacy score+$w_{consistency}$×Consistency score wherein Consistency=$w_{utility}$×Utility score+$w_{similarity}$×Similarity score;
wherein w represents the respective weights assigned to each metric i.e. $w_{privacy}$=weight assigned to privacy metric; $w_{utility}$=weight assigned to utility metric; and $w_{similarity}$=weight assigned to similarity metric.
As per an example the weights associated or assigned to each metric may be as follows:

$$\text{Weights} = \begin{cases} w_{privacy} = 0.75 \\ w_{consistency} = 0.25 \\ w_{utility} = 0.60 \\ w_{similarity} = 0.40 \end{cases}$$

BASED on the above exemplary weights, the final output can be obtained as:

Final output value (Global computation) =

0.75 * Privacy score + 0.25 * Consistency score =

0.75 * Privacy score + 0.25(0.60 * Utility score + 0.40 * Similarity score)

In an example, and considering the previous examples described hereinabove, the privacy score is evaluated to be 96.5%, the utility score is 92.5% and the similarity score is 75%, then the final output value/score (global computation score) can be evaluated as:

Final output (Global computation) =

$0.75 * 96.5 + 0.25(0.60 * 92.5 + 0.40 * 75) = 72.4 + 0.25(55.5 + 30) = 93.7\%$

This final output depicts the evaluation results obtained in one exemplary case of an anonymized dataset. However, the present disclosure is not limited to these examples, and other values of weight/scores and other examples/evaluation results are also possible.

Figure 5A:
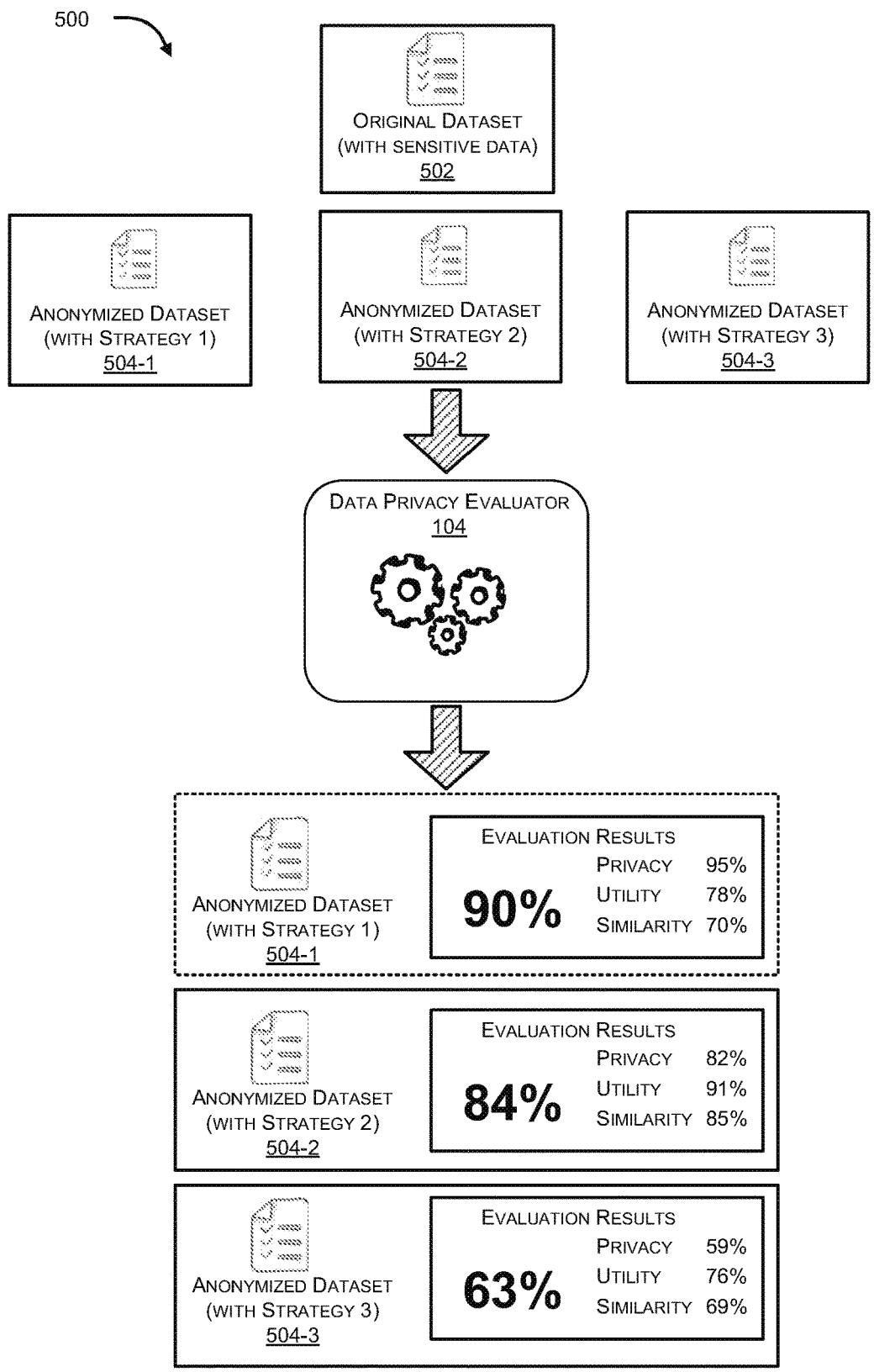
FIGS. 5A-5B illustrate an overview indicating the steps involved in obtaining an endorsed anonymized dataset, according to an example embodiment of the present disclosure.
Figure 5B:
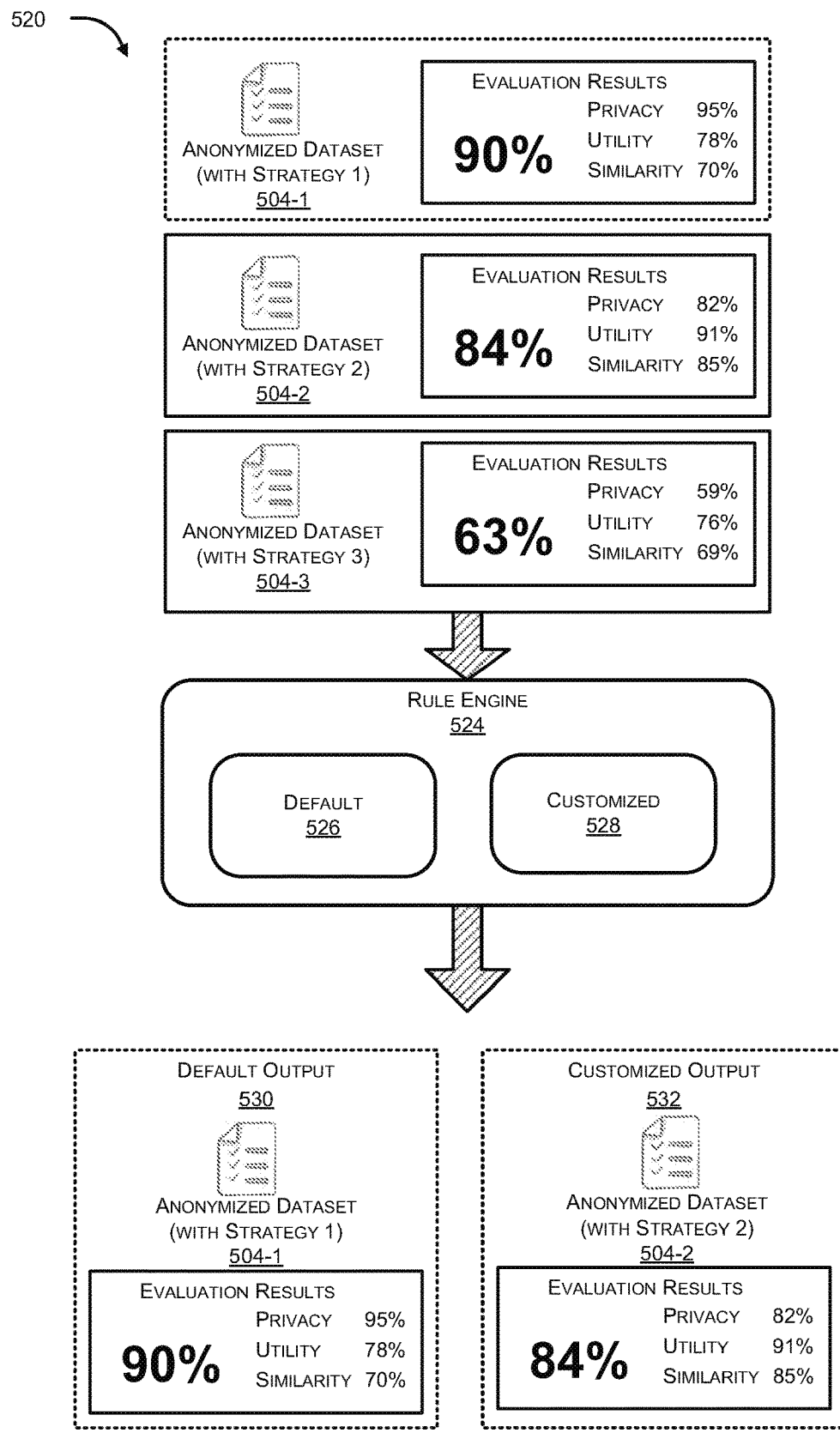

In an example embodiment, if multiple anonymized datasets are evaluated, the processor 102 may compare at least one of the first output, second output and the final output value of the multiple anonymized datasets to endorse a single anonymized dataset of the multiple anonymized datasets. FIGS. 5A-5B illustrates overview (500, 520) indicating the steps involved in obtaining an endorsed anonymized dataset, according to an example embodiment of the present disclosure. As illustrated in FIG. 5A, multiple anonymized datasets 504-1, 504-2, 504-3 may be obtained for an original dataset 502 having sensitive data. The data privacy evaluator may generate evaluation results as shown in FIG. 1, wherein the system may endorse the anonymized dataset (504-1) (shown in dotted lines) as it shows good trade-off between the privacy metric (privacy score=95%), the utility metric (utility score=78%) and the similarity metric (similarity score=70%) to give a final output value (global computation) of 90%. The final output value may vary based on the weights assigned to each metric. Further, as illustrated in FIG. 5B, the same results may be assessed by a rule engine 524 (same as rule engine 114 of FIG. 1). The rule engine 524 may permit a first set of predefined rules to be set by at least one mode such as manually i.e. customized 528 and automatically i.e. default 526. In an example embodiment, if the mode is default 526, then the first set of predefined rules may choose higher global computation (final output value) with a threshold for privacy metric as above 95% and a threshold for utility/similarity metrics (utility/similarity scores) as over 70%. In an example embodiment, if the mode is customized 528, then the first set of predefined rules may be chosen by the user manually. In an example embodiment, the user may choose a set a minimum level of threshold for each metric and may also provide a purpose of anonymization such that the processor can endorse the anonymized dataset that may best suit the first set of predefined rules. In another example embodiment, the user may specify an anonymization purpose such as, for example, data monetization, sharing to a third party, data analytics, such that the processor may recommend or use the threshold for each metric adapted to the purpose mentioned. For example, if the anonymization is done for sharing the data, the anonymization engine may suggest, for example, for academic purposes, a threshold for privacy score over 90% as privacy risk in this case may be acceptable if less than 10%. As another example, for business purpose, privacy score over 95% may be used as 5% re-identification risk may be the maximum threshold acceptable in this case.

In an example embodiment, the system of the present disclosure may assess an efficiency of anonymization process to check compliance with data protection and regulation laws. The system may be used to ensure that anonymity is improved i.e. re-identification risk is reduced, while ensuring that data value is preserved.

Figure 6:
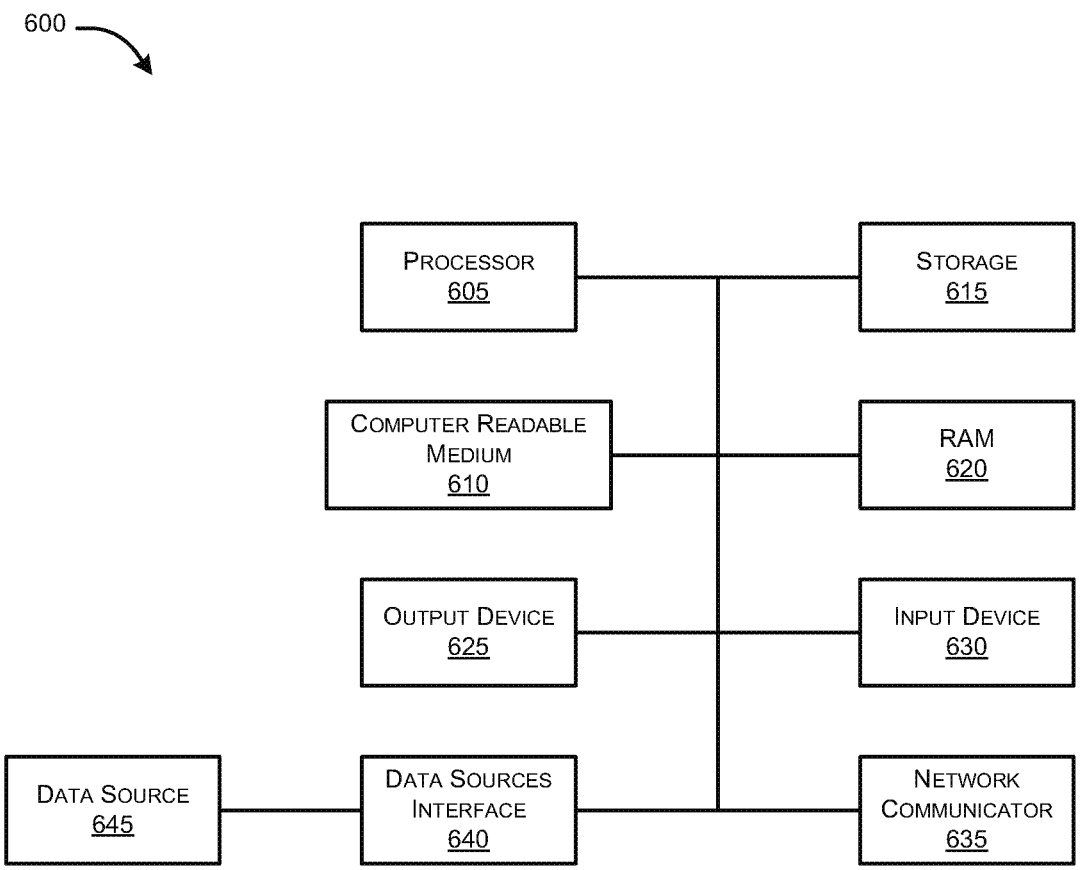
FIG. 6 illustrates a hardware platform for implementation of the disclosed system, according to an example embodiment of the present disclosure.

FIG. 6 illustrates a hardware platform (600) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 600. As illustrated, the hardware platform 600 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 600 may be a computer system such as the system 100 that may be used with the embodiments described herein. The computer system may represent a computational platform that includes components that may be in a server or another computer system. The computer system may execute, by the processor 605 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 605 that executes software instructions or code stored on a non-transitory computer-readable storage medium 610 to perform methods of the present disclosure. The software code includes, for example, instructions to evaluate the anonymized datasets with original dataset. In an example, the data privacy evaluator 104, the privacy computation engine 106, consistency computation engine 108, utility computation engine 110, similarity computation engine privacy may be software codes or components performing these steps.

The instructions on the computer-readable storage medium 610 are read and stored the instructions in storage 615 or in random access memory (RAM). The storage 615 may provide a space for keeping static data where at least some instructions could be stored for later execution. The stored instructions may be further compiled to generate other representations of the instructions and dynamically stored in the RAM such as RAM 620. The processor 605 may read instructions from the RAM 620 and perform actions as instructed.

The computer system may further include the output device 625 to provide at least some of the results of the execution as output including, but not limited to, visual information to users, such as external agents. The output device 625 may include a display on computing devices and virtual reality glasses. For example, the display may be a mobile phone screen or a laptop screen. GUIs and/or text may be presented as an output on the display screen. The computer system may further include an input device 630 to provide a user or another device with mechanisms for entering data and/or otherwise interact with the computer system. The input device 630 may include, for example, a keyboard, a keypad, a mouse, or a touchscreen. Each of these output device 625 and input device 630 may be joined by one or more additional peripherals. For example, the output device 625 may be used to display the results of evaluation by data privacy evaluator 104 or to indicate the anonymized dataset endorsed by the system 100.

A network communicator 635 may be provided to connect the computer system to a network and in turn to other devices connected to the network including other clients, servers, data stores, and interfaces, for instance. A network communicator 635 may include, for example, a network adapter such as a LAN adapter or a wireless adapter. The computer system may include a data sources interface 640 to access the data source 645. The data source 645 may be an information resource. As an example, a database of exceptions and rules may be provided as the data source 645. Moreover, knowledge repositories and curated data may be other examples of the data source 645.

Figure 7:
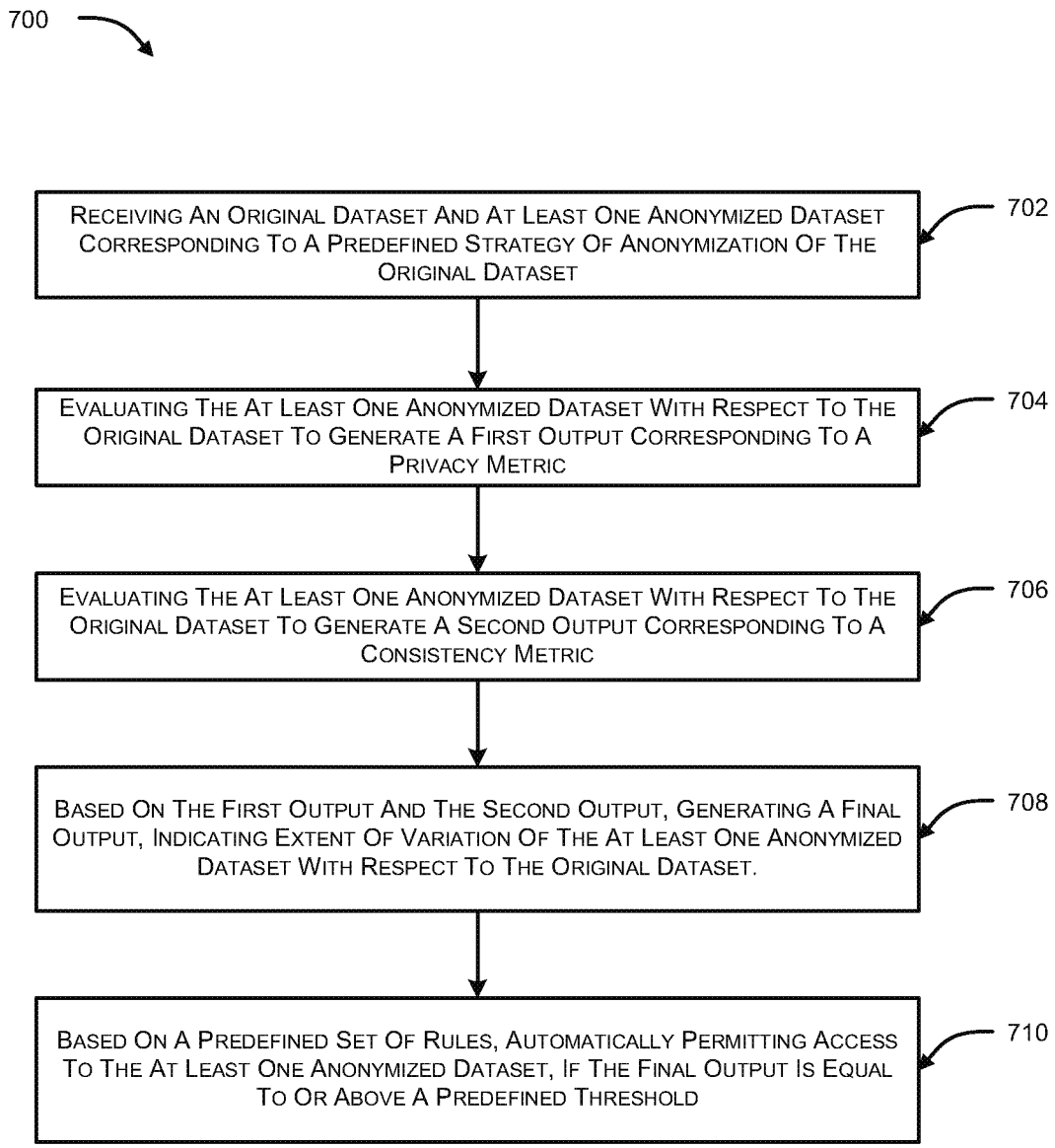
FIG. 7 illustrates a flow diagram for facilitating a rule-based anonymization of an original dataset, according to an example embodiment of the present disclosure.

FIG. 7 illustrates a flow diagram 700 for facilitating a rule based anonymization of an original dataset, according to an example embodiment of the present disclosure. At 702, the method includes a step of receiving an original dataset and at least one anonymized dataset corresponding to a pre-defined strategy of anonymization of the original dataset. At 704, the method includes a step of evaluating the at least one anonymized dataset with respect to the original dataset to generate a first output corresponding to a privacy metric. At 706, the method includes a step of evaluating the at least one anonymized dataset with respect to the original dataset At 706, the method includes a step to generate a second output corresponding to a consistency metric. At 708, the method includes a step of generating, based on the first output and the second output, a final output value, indicating extent of the at least one anonymized dataset with respect to the original dataset. At 710, the method includes a step of permitting automatically, based on a first set of predefined rules, an access to the at least one anonymized dataset, if the final output value is equal to or above a predefined threshold. In another example embodiment, if the final output value is less than the predefined threshold, the method may include at least one of generating an alert and automatically communicating feedback to an anonymization engine. The alert may be generated to indicate that the pre-defined strategy of anonymization is insufficient to provide desired privacy protection of the original dataset. The feedback may be communicated to generate another anonymized dataset for the corresponding original dataset based on a modified predefined strategy of anonymization.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor comprising:
a data privacy evaluator to:
receive, from a raw data repository associated with the system, an original dataset pertaining to a domain;
receive, at least one anonymized dataset corresponding to a predefined strategy of anonymization, wherein the at least one anonymized dataset is received from at least one of an anonymization engine and an anonymized data repository, wherein the at least one anonymized dataset includes a variation from the original dataset by at least one of a privacy metric and a consistency metric, wherein the privacy metric pertains to a risk of re-identification of an information pertaining to an entity in the at least one anonymized dataset corresponding to the original dataset, and wherein the consistency metric pertains to a combination of a utility metric and a similarity metric;
evaluate, through a privacy computation engine of the processor, the at least one anonymized dataset with respect to the original dataset to generate a first output corresponding to the privacy metric; and
evaluate, through a consistency computation engine of the processor, the at least one anonymized dataset with respect to the original dataset to generate a second output corresponding to the consistency metric;
wherein based on the first output and the second output, the processor generates a final output value indicating an extent of the variation of the at least one anonymized dataset with respect to the original dataset; and
wherein the similarity metric corresponds to a similarity score that pertains to an extent of a statistical similarity between the at least one anonymized dataset and the original dataset, wherein the similarity metric is determined between two probability distributions, wherein the similarity score is computed by determining a divergence between an anonymized feature in the anonymized dataset and a corresponding original feature in the respective original dataset by using a statistical test including at least one of a Kolmogorov-Smirnov (KS) test, Kullback-Leibler (KL) divergence test, entropy test, and the Wassertein distance based evaluation, wherein if the divergence is lower than a predefined threshold $S_t$, the anonymized feature and the original feature are considered to be similar, and wherein the similarity score is calculated as a ratio of a sum of similar features to a total number of features being evaluated.

2. The system as claimed in claim 1, wherein the processor is coupled with the anonymization engine associated with the system, wherein the anonymization engine generates the at least one anonymized dataset corresponding to the predefined strategy of anonymization, and
wherein the at least one anonymized dataset is stored in the anonymized data repository.

3. The system as claimed in claim 2, wherein the anonymization engine generates multiple anonymized datasets, each of the multiple anonymized datasets includes a different predefined strategy of anonymization, and
wherein the processor evaluates the multiple anonymized datasets to identify a suitability of anonymization including an optimal value of at least one of the privacy metric and the consistency metric.

4. The system as claimed in claim 3, wherein the processor performs an evaluation comparison by comparing at least one of the first output, the second output and the final output value of the multiple anonymized datasets,
wherein, based on the evaluation comparison, the processor recommends an endorsed anonymized dataset from the multiple anonymized datasets, the endorsed anonymized dataset including the most optimal value of at least one of the privacy metric and the consistency metric in comparison to other datasets in the multiple anonymized datasets.

5. The system as claimed in claim 1, wherein a rules engine of the processor, based on a first set of predefined rules, determines the final output value with respect to a predefined threshold, wherein if the final output value is equal or higher than the predefined threshold, the system permits an access of the anonymized dataset to an external system, wherein if the final output value is less than the predefined threshold, the system performs at least one of generating an alert to indicate that the pre-defined strategy of anonymization is insufficient to provide desired privacy protection of the original dataset and automatically communicating feedback to the anonymization engine to generate another anonymized dataset for the corresponding original dataset based on a modified pre-defined strategy of anonymization.

6. The system as claimed in claim 1, wherein the risk of re-identification pertains to an extent of anticipation of the information pertaining to the entity in the at least one anonymized dataset.

7. The system as claimed in claim 1, wherein the privacy computation engine evaluates the privacy metric in the at least one anonymized dataset to identify at least one of an identifier, a quasi-identifier, a sensitive attribute and a neutral attribute.

8. The system as claimed in claim 7, wherein the identifier corresponds to a mode of unambiguous re-identification of the entity, the quasi-identifier pertains to a variable which, in combination with another variable, facilitates possible re-identification of the entity, the sensitive attribute relates to a confidential information pertaining to the entity, and the neutral attribute is devoid of the identifier, the quasi-identifier and the sensitive attribute.

9. The system as claimed in claim 7, wherein the privacy computation engine selectively designates a plurality of equivalence classes (EC) pertaining to the identified quasi-identifier, each EC corresponding to a set of records that are indistinguishable from each other with respect to the quasi-identifier.

10. The system as claimed in claim 7, wherein the privacy computation engine extracts, based on a predefined factor, a selected set of Equivalence Class (EC) from a plurality of EC, wherein the selected set of EC pertains to a set of scattered records that are incompatible with a predefined criterion associated with the predefined factor, wherein the predefined factor comprises at least one of a predefined k-factor to check k-anonymity of the anonymized dataset, predefined l-factor to check l-diversity principle corresponding to the anonymized dataset and predefined t-factor to check t-closeness factor in the anonymized dataset, and wherein the predefined factor indicates a range or a value specific to the domain.

11. The system as claimed in claim 7, wherein the privacy computation engine independently computes an Euclidian distance for each record corresponding to a set of scattered records and each quasi-identifier corresponding to the set of scattered records based on respective records in the original dataset to identify a set of identified records including re-identification risk above a predefined privacy threshold, wherein the set of identified records include proximity with the respective records in the original dataset.

12. The system as claimed in claim 11, wherein the Euclidian distance is computed by performing a closeness analysis to evaluate at least one of a global closeness score and a quasi-identifier based closeness score, wherein the global closeness score corresponds to an evaluation result obtained by computing the Euclidian distance between each record corresponding to the set of scattered records and respective record in the original dataset, the quasi-identifier based closeness score being obtained by computing the Euclidian distance between each quasi-identifier corresponding to the set of scattered records and the respective record in the original dataset, wherein the set of identified records are obtained by assessing if at least one of the global closeness score and the quasi-identifier based closeness score lies above a respective privacy threshold, and wherein the set of identified records are obtained by recognizing a pair that include a smallest Euclidian distance between a record from the set of scattered records and respective original record of the pair.

13. The system as claimed in claim 12, wherein the set of identified records are obtained by identifying and extracting at least one of a first group of records that include the global closeness score above a first privacy threshold and a second group of records that include the quasi-identifier based closeness score above a second privacy threshold, wherein the privacy computation engine computes the first output by calculating a ratio of the set of identified records to the plurality of records, wherein the first output corresponds to the privacy metric and indicates a percentage of the plurality of records that include the risk of re-identification.

14. The system as claimed in claim 13, wherein the first output corresponds to a privacy score based on a privacy risk associated with the anonymized dataset, wherein the privacy risk may be calculated by taking a ratio of the union of the first group of records ($SR_{global}$) and the second group of records ($SR_{QI}$) to a total number of records in the anonymized dataset, the union corresponding to a combination of the first group of records and the second group of records after removing duplicated records present therein.

15. The system as claimed in claim 1, wherein the second output corresponds to the consistency metric that includes a predefined weight assigned to the utility metric and the similarity metric.

16. The system as claimed in claim 1, wherein the utility metric corresponds to a utility score that is determined by analyzing a predictive performance of the at least one anonymized dataset in comparison to the original dataset, wherein the predictive performance pertains to a predicting ability of a machine learning (ML) model that is trained using the anonymized dataset and is based on at least one of an accuracy and a weighted score pertaining to precision and recall, wherein the utility score is computed by taking a weighted sum of ratios pertaining to the accuracy and a F1-score with respect to the anonymized dataset and the original dataset.

17. The system as claimed in claim 1, wherein the data privacy evaluator generates the final output value based on a weighted sum of the each of the first output and the second output, wherein a predefined weight is assigned to each of the privacy metric, utility metric and the similarity metric, wherein the predefined weight is determined by the rules engine based on a second set of predefined rules that depends on at least one of the domain and a purpose of anonymization.

18. A method for facilitating a rule-based anonymization of an original dataset, the method comprising:

receiving, by a processor, the original dataset and at least one anonymized dataset corresponding to a predefined strategy of anonymization of the original dataset;

evaluating, by the processor, the at least one anonymized dataset with respect to the original dataset to generate a first output corresponding to a privacy metric;

evaluating, by the processor, the at least one anonymized dataset with respect to the original dataset to generate a second output corresponding to a consistency metric, wherein the consistency metric pertains to a combination of a utility metric and a similarity metric;

generating, by the processor, based on the first output and the second output, a final output value, indicating extent of the at least one anonymized dataset with respect to the original dataset; and permitting automatically, by the processor, based on a first set of predefined rules, an access to the at least one anonymized dataset, if the final output value is equal to or above a predefined threshold, wherein if the final output value is less than the predefined threshold, the method comprises at least one of generating an alert to indicate that the pre-defined strategy of anonymization is insufficient to provide desired privacy protection of the original dataset and automatically communicating feedback to an anonymization engine to generate another anonymized dataset for the corresponding original dataset based on a modified predefined strategy of anonymization; and wherein the similarity metric corresponds to a similarity score that pertains to an extent of a statistical similarity between the at least one anonymized dataset and the original dataset, wherein the similarity metric is determined between two probability distributions, wherein the similarity score is computed by determining a divergence between an anonymized feature in the anonymized dataset and a corresponding original feature in the respective original dataset by using a statistical test including at least one of a Kolmogorov-Smirnov (KS) test, Kullback-Leibler (KL) divergence test, entropy test, and the Wassertein distance based evaluation, wherein if the divergence is lower than a predefined threshold $S_t$, the anonymized feature and the original feature are considered to be similar, and wherein the similarity score is calculated as a ratio of a sum of similar features to a total number of features being evaluated.

19. A non-transitory computer readable medium, wherein the readable medium comprises machine executable instructions that are executable by a processor to:

receive an original dataset and at least one anonymized dataset corresponding to a predefined strategy of anonymization of the original dataset;

evaluate the at least one anonymized dataset with respect to the original dataset to generate a first output corresponding to a privacy metric;

evaluate the at least one anonymized dataset with respect to the original dataset to generate a second output corresponding to a consistency metric, wherein the consistency metric pertains to a combination of a utility metric and a similarity metric;

generate based on the first output and the second output, a final output value, indicating extent of the at least one anonymized dataset with respect to the original dataset; and permit automatically, based on a first set of predefined rules, an access to the at least one anonymized dataset, if the final output is equal to or above a predefined threshold, wherein if the final output value is less than the predefined threshold, the processor performs at least one of generating an alert to indicate that the pre-defined strategy of anonymization is insufficient to provide desired privacy protection of the original dataset and automatically communicating feedback to an anonymization engine to generate another anonymized dataset for the corresponding original dataset based on a modified predefined strategy of anonymization; and wherein the similarity metric corresponds to a similarity score that pertains to an extent of a statistical similarity between the at least one anonymized dataset and the original dataset, wherein the similarity metric is determined between two probability distributions, wherein the similarity score is computed by determining a divergence between an anonymized feature in the anonymized dataset and a corresponding original feature in the respective original dataset by using a statistical test including at least one of a Kolmogorov-Smirnov (KS) test, Kullback-Leibler (KL) divergence test, entropy test, and the Wassertein distance based evaluation, wherein if the divergence is lower than a predefined threshold $S_t$, the anonymized feature and the original feature are considered to be similar, and wherein the similarity score is calculated as a ratio of a sum of similar features to a total number of features being evaluated.

* * * * *